Feb. 19, 1957 G. BURKHARDT 2,781,882
SAFETY COUPLINGS
Filed May 14, 1954
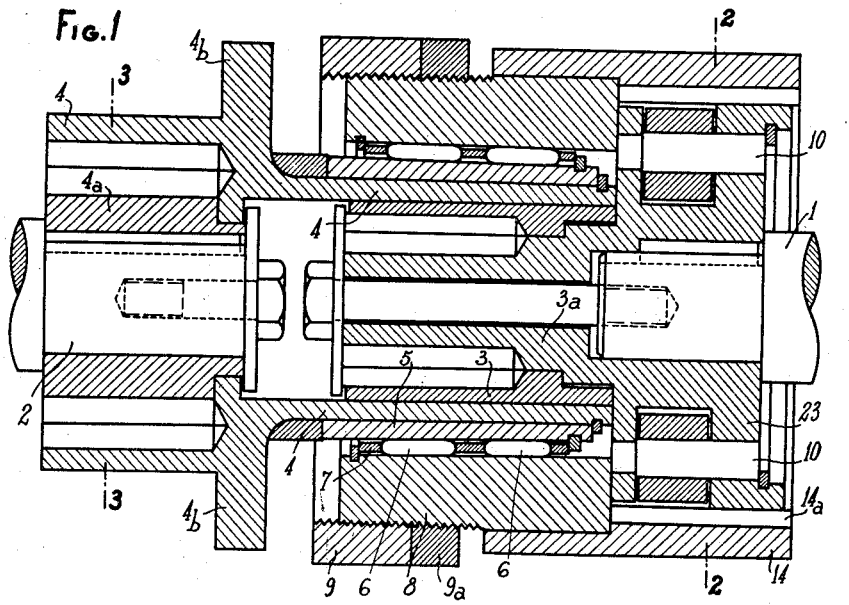
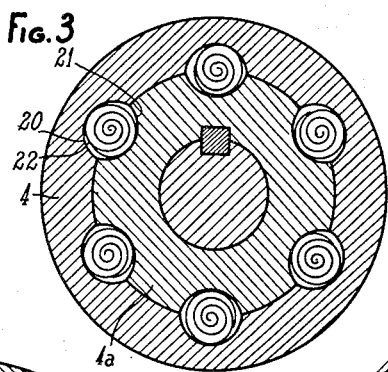
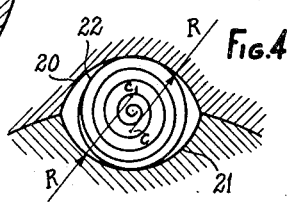
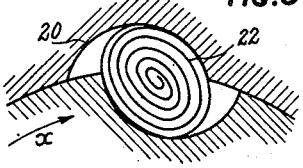
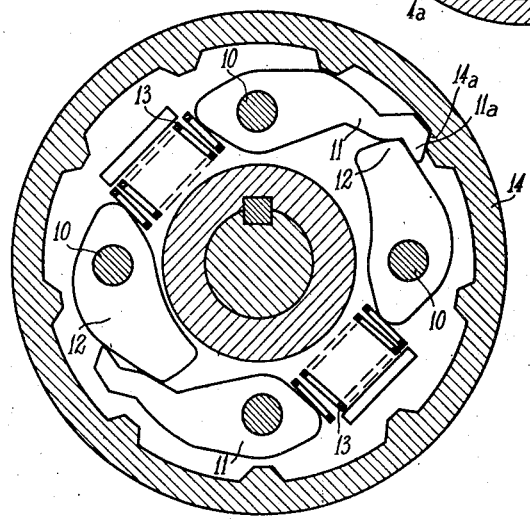
INVENTOR
GUSTAVE BURKHARDT

United States Patent Office 2,781,882
Patented Feb. 19, 1957

2,781,882

SAFETY COUPLINGS

Gustave Burkhardt, La Garenne-Colombes, France

Application May 14, 1954, Serial No. 429,945

Claims priority, application France May 15, 1953

8 Claims. (Cl. 192—56)

My invention relates to safety couplings of the general type adapted to transmit a drive torque from a drive to a drive member so long as the torque to be transmitted has not exceeded a predetermined value, but which will disengage the drive transmission when said value is exceeded, in order to prevent damage to the operating parts.

In many cases it is found desirable that the coupling be capable during a starting-up period of transmitting a torque substantially greater than that which is normally permissible during the steady operating condition or at full speed.

It is, accordingly, a main object of the invention to provide a safety coupling which will disengage automatically under loads higher than a predetermined load at speeds in excess of a predetermined speed, and yet will not disengage under similar loads at lesser speeds.

Another object is to provide an improved safety coupling which, on attainment of a predetermined angular speed, will be made effective to disengage automatically on occurrence of slippage between the coupled members.

A further object is to provide a safety coupling which on attainment of a predetermined angular speed will be made effective to disengage automatically on subsequent occurrence of slippage between the coupled members, and which will thereafter retain its effective condition until the angular speed has dropped to a value substantially lower than said predetermined speed.

A further object is to provide an improved safety coupling which will permit starting under overload conditions.

A further object is to provide an improved safety coupling of the above-specified type adapted for instantaneous reengagement.

Further objects together with the features and advantages of the invention will appear as the disclosure proceeds.

An exemplary embodiment of the invention will now be described with reference to the accompanying diagrammatic drawings, by way of illustration but not of limitation.

In the drawings:

Fig. 1 is an axial sectional view of an improved coupling;

Fig. 2 is a cross section on line 2—2 of Fig. 1;

Fig. 3 is a section on line 3—3 of Fig. 1;

Figs. 4 and 5 are sectional views, on an enlarged scale of a yielding connecting element respectively in the undistorted and distorted condition.

As shown, a drive shaft 1 and a driven shaft 2 are inter-connected by a needle coupling assembly of the so-called Stieber type, as disclosed for example in French Patent 807,248, filed June 9, 1936. Such a coupling is capable of transmitting a comparatively high torque with only a very low degree of pressure between the coupling members. For this purpose, the drive shaft 1 has secured coaxially with it a bushing 3a. A further bushing 3 shown as surrounding the bushing 3a for a purpose to be described later may for the present be considered as forming an integral part with the bushing 3a. Similarly secured on the driven shaft 2 is a bushing 4. Shown as interposed between shaft 2 and bushing 4 is a bushing 4a to be later described and which may temporarily be regarded as integral with the bushing 4. The bushing 4 surrounds the bushing 3 in slide-fit engagement with it and longitudinally extending slots are preferably formed in the bushing 4 to facilitate the engagement. Surrounding the bushing 4 is a further bushing or sleeve 5 also formed with one or more slots for tight engagement of sleeve 5 around bushing 4. The sleeve 5 has a slightly tapered outer periphery to serve as an inner race for a needle bearing comprising the needles 6 retained by means of a cage 7. Said needles, in addition to being conically inclined with respect to the axis of the shafts, are offset or twisted a small angle with respect to the axis of the shafts, as is conventional in a Stieber coupling. An outer race is provided for the needle bearing by a ring 8 having an inner surface formed with a complementary taper to that of the inner race member 5. Because of the inclination of the twisted needles 6, a difference of the speeds of rotation of the drive shaft and the driven shaft in one direction will cause the ring 8 to be moved onto the sleeve 5 with a screw-like action, while relative movement between the shafts in the opposite direction will cause the ring 8 to be unscrewed.

To clamp the above described structure in assembled relationship the outer ring 8 is rotated in a direction reverse from the normal rotation of the drive and driven shafts. Because the needles 6 are twisted with respect to the axis of the shafts, the ring 8 will be moved onto the ring 5. The rotation of ring member 8 is limited by means of a nut 9 and a locknut 9a engaging a threaded portion of the outer periphery of ring 8, the nut 9 being adapted to be blocked against a shoulder 4b or flange 4b formed on the driven bushing 4. In this way the degree of clamping engagement between the members of the assembly can be adjusted as desired. The locknut 9a fixes the position of nut 9. The structure so far described comprises a conventional Stieber coupling as disclosed for instance in the afore-mentioned patent.

According to a feature of the present invention the bushing assembly 3—3a associated with drive shaft 1 has a number of equispaced pins 10 projecting axially therefrom in the rearward direction (toward shaft 1); while four pins 10 are shown herein, any other suitable number may be used. Two diametrically opposed ones of the pins 10 each have a centrifugal element or pawl 11 freely pivoted thereon, see Fig. 2, while the other diametrically opposed pair of pins 10 have cooperating locking free members 12 freely pivoted thereon. Between one end of each pawl 11 and the adjacent end of the adjacent locking member 12 a spring 13 is interposed. The springs 13 tend to urge the pawls and members to the relative condition illustrated in the lower part of Fig. 2, which is the idle condition.

Secured to the outer periphery of outer ring member 8 is an annulus 14 internally formed with equispaced projections or teeth 14a. The pawls 11 have the end thereof remote from that abutting the springs 13 formed with a nose portion 11a including a surface adapted to engage a side of any one of the teeth 14a when the pawl 11 is pivoted counterclockwise (according to Fig. 2) in opposition to the action of springs 13. This position of the pawl is illustrated for the upper pawl in Fig. 2. Moreover, the nose portion of each pawl 11 is formed with a concave portion adapted, when the pawl has assumed the condition just indicated, to interlock with a complementary portion of the adjacent end of the adjacent locking member 12.

It will be noted from Fig. 2 that the configuration of the pawls 11 and locking members 12 is such that, when the assembly is rotated, centrifugal force will tend to pivot the pawls 11 counterclockwise and the weight members 12 clockwise, since the longer arm of the pawl 11 faces the longer arm of the locking member 12. The springs 13 will resist such movement however, and the force of the springs is so predetermined that the pawls and locking members are allowed to pivot in order to assume the above-described interlocking condition (as shown for the upper assembly in Fig. 2) as the speed of rotation approaches its normal operating value.

When in this interlocking condition the radial distance of the centre of gravity of each pawl 11 and each member 12 from the centre of shaft 1 is increased over the radial distance of the centre of gravity of those parts in the non-interlocked (inoperative) condition of the parts; at the same time, the point of engagement of the spring 13 with the pawl and locking member is shifted in such a direction as to reduce the leverage of the spring acting to restore the parts to their free or inoperative position; this reduction being especially great in respect of the locking members 12. As a result of the foregoing effects, the pawls and locking members are unable to return to their inoperative position until the speed of rotation of the structure has dropped substantially to zero.

In operation, as the drive torque exceeds the limiting value for which the coupling has been preset, relative slippage occurs between the bushing assembly 3—3a associated with drive shaft 1 and bushing assembly 4—4a associated with driven shaft 2. The outer clamping ring 8 is at this time integrally connected for movement with the bushing 3—3a owing to the pawls 11 now being in their interlocked position with the teeth 14a of annulus 14; said ring 8 therefore will revolve somewhat faster than the sleeve 5 to produce a relative movement of the ring with respect to the sleeve; because of the inclination of needles 6, this in turn causes an initial unscrewing and disengagement of the coupling and increases the relative slippage between the drive and driven members, thereby accelerating the full release of the coupling.

Thus it will be seen that, on the one hand, the release of the coupling cannot occur until the pawls have assumed their operative interlocking condition; hence the coupling cannot become released during the starting period when a higher drive torque is required to be transmitted; on the other hand, the pawls are unable to return to their initial inoperative condition even if the speed of rotation materially decreases. The coupling also releases therefore if the increase in transmitted load results in a simultaneous decrease in speed.

According to a feature of the invention, yielding connecting elements may be provided. Such elements may be interposed between the bushings 4 and 4a, or alternatively between the bushings 3 and 3a, or, as shown, both between bushings 4, 4a and between bushings 3, 3a.

For this purpose, recesses 20 and 21 are formed in the bushings 4 and 4a parallel to the axis thereof. As shown in Fig. 4, each recess is a portion of a cylinder of circular cross section. The circular cross sections of recesses 20 and 21 are preferably equal in radius but have their centres displaced, as shown in the figure so that the arc constituting the cross section of each recess 20 or 21 subtends an angle of somewhat less than 180°.

Received in the housing formed by each pair of recesses 20, 21 is a spring 22, e. g. as shown a spiral spring of substantial width in the axial direction, so that each spring may correspond in length to the length of the recesses or to a substantial fraction of said length. In the rest condition, these springs have the undistorted shape visible in Fig. 4. When however the bushing 4a is displaced relative to the bushing 4 in the direction of the arrow x in Fig. 5, the springs become distorted between the cylindrical walls of the recesses thereby providing a yielding connection between the bushings. A similar yielding connection is provided between the bushings 3 and 3a; the associated recesses are clearly shown in Fig. 1.

It will be understood that many different embodiments of the invention may be designed other than the single embodiment shown. Thus it will be evident that the pawls 11, 12 might be pivoted to a part connected with the annulus 14, while the teeth 14 would then be provided on the hub 23 keyed to the drive shaft 1.

What I claim is:

1. In a coupling for a drive and a driven shaft, the drive shaft having a sleeve integral therewith and the driven shaft having a sleeve with a conical surface integral therewith fitting over the sleeve of the drive shaft, a tightening ring having an interior conical surface complementary to the conical surface on the driven shaft sleeve, a plurality of needle roller bearings positioned between said conical surfaces at an angle to the axis of said shafts, whereby on rotation of said tightening ring in a direction opposite to the direction of rotation of the shafts the tightening ring is tightened onto said driven shaft sleeve, and a cage to hold said bearings in position, that improvement comprising means on said drive shaft operable at a predetermined speed to lock said tightening ring to said shaft, and means on said drive shaft acting on said locking means to retain said locking means in the locked position.

2. The improvement as claimed in claim 1 in which said means for locking the drive shaft to said tightening ring at a predetermined speed of the drive shaft comprises a plurality of pawls pivoted on said drive shaft, an annulus fixed to said tightening ring and surrounding said pawls and having a plurality of inwardly projecting teeth, said pawls coming into engagement with the teeth under the action of centrifugal force at a predetermined speed of said drive shaft.

3. The improvement as claimed in claim 1 in which said retaining means comprise a plurality of small masses pivoted on the drive shaft and positioned to swing outwardly and engage said locking means under the action of centrifugal force.

4. The improvement as claimed in claim 1 in which said means for locking the drive shaft to said tightening ring at a predetermined speed of the drive shaft comprises a plurality of pawls pivoted on said drive shaft, an annulus fixed to said tightening ring and surrounding said pawls and having a plurality of inwardly projecting teeth, said pawls coming into engagement with the teeth under the action of centrifugal force at a predetermined speed of said drive shaft, and in which said retaining means comprise a plurality of small masses pivoted on the drive shaft and positioned to swing outwardly and engage under the ends of the pawls engaging the teeth of the tightening ring under the action of centrifugal force.

5. The improvement as claimed in claim 4 in which said pawls and small masses are pivoted with their pivoted ends opposed to each other, said retaining means further comprising a plurality of springs which are disposed between the opposed pivoted ends of the pawls and the small masses, said springs being of such strength that the pawls and the small masses are moved towards the annulus by centrifugal force to engage the teeth only when the speed of the drive shaft reaches a predetermined value, the form of the ends of the pawls and the small masses engaged by said springs being such that the springs cannot force the pawls and the small masses out of the locking position until the speed of rotation of the drive shaft becomes very small.

6. In a coupling as claimed in claim 1, that further improvement comprising means to elastically couple said shafts, said means extending parallel to the axis of the shafts and being positioned between the drive shaft and the sleeve thereon and the driven shaft and the sleeve thereon.

7. The improvement as claimed in claim 6 in which said means for elastically coupling the shafts comprise spirally wound longitudinal springs, said sleeves and shafts having opposed longitudinal grooves therein in which said springs are positioned, relative movement of the shafts and sleeves causing the springs to be wound more tightly.

8. The improvement as claimed in claim 7, said grooves having a cross section in the shape of a segment of a circle which is less than half a circle.

References Cited in the file of this patent

UNITED STATES PATENTS

| | | |
|---|---|---|
| 1,298,395 | Proctor | Mar. 25, 1919 |
| 1,692,703 | Rigolage | Nov. 20, 1928 |

FOREIGN PATENTS

| | | |
|---|---|---|
| 864,965 | France | May 9, 1941 |